April 7, 1942.　　A. RICCARDI　　2,278,798
GAS PRODUCER APPARATUS
Filed July 21, 1938　　4 Sheets-Sheet 1
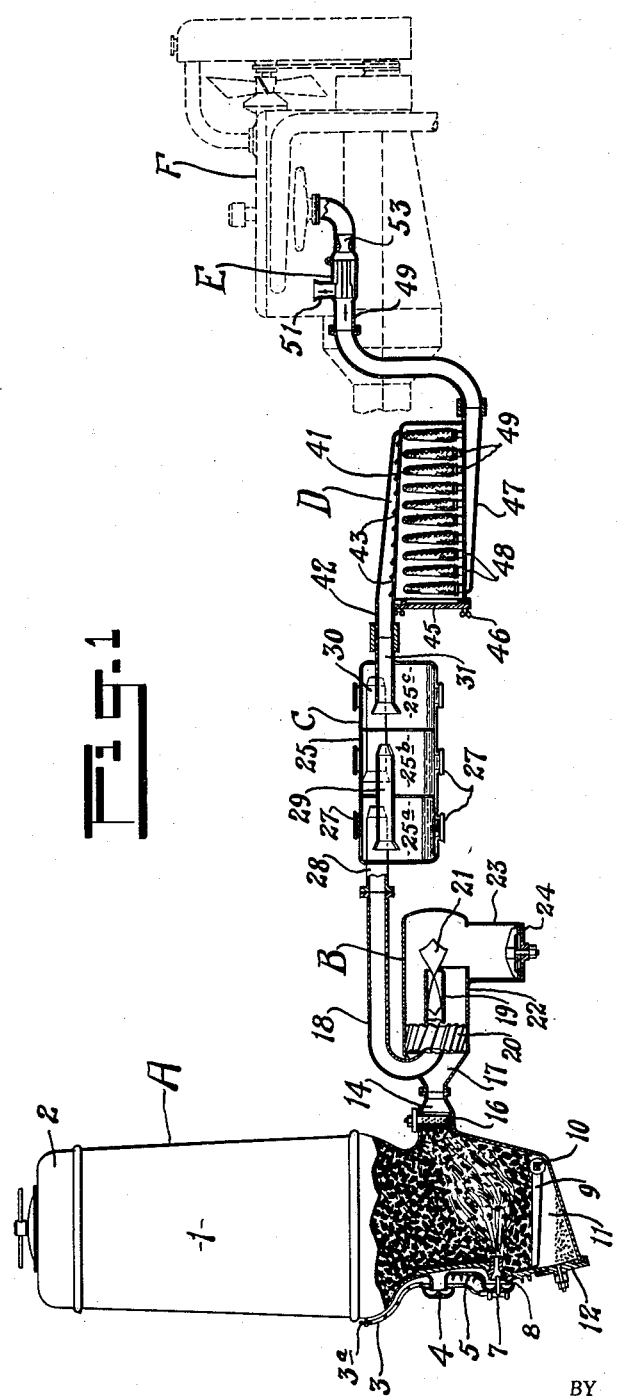
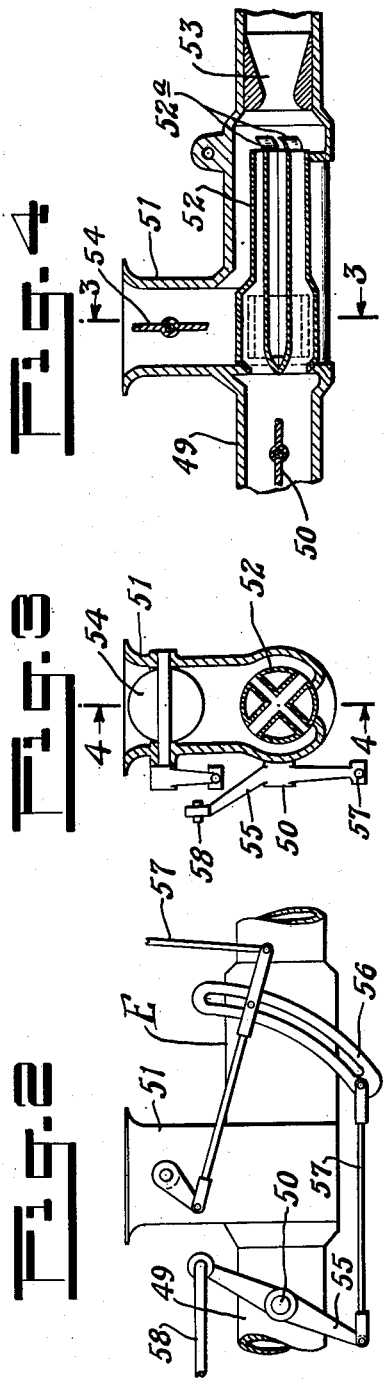
INVENTOR.
Aristide Riccardi
BY Darby & Darby
ATTORNEYS April 7, 1942.    A. RICCARDI    2,278,798
GAS PRODUCER APPARATUS
Filed July 21, 1938    4 Sheets-Sheet 2
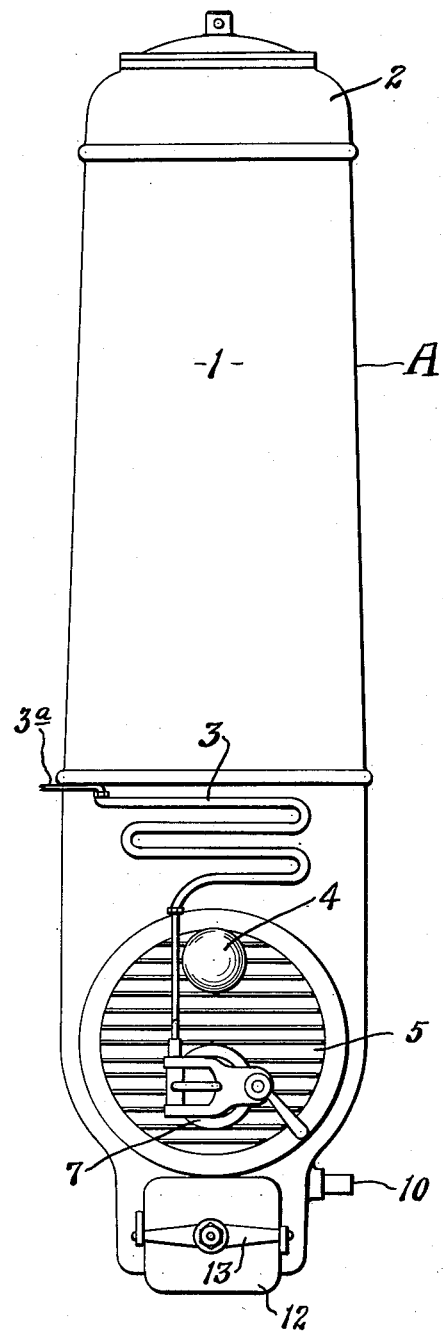
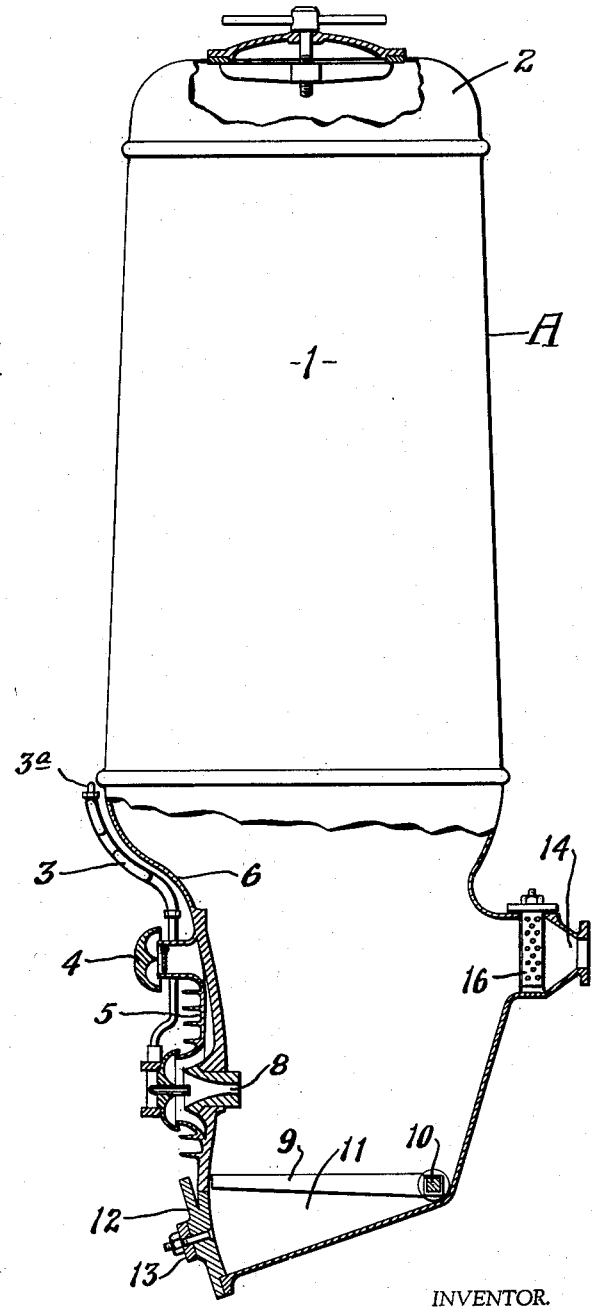
INVENTOR.
Aristide Riccardi
BY Darby & Darby
ATTORNEYS April 7, 1942.  A. RICCARDI  2,278,798
GAS PRODUCER APPARATUS
Filed July 21, 1938  4 Sheets-Sheet 3
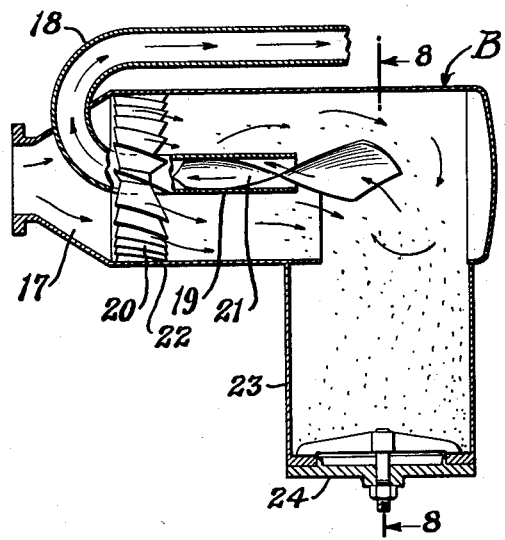
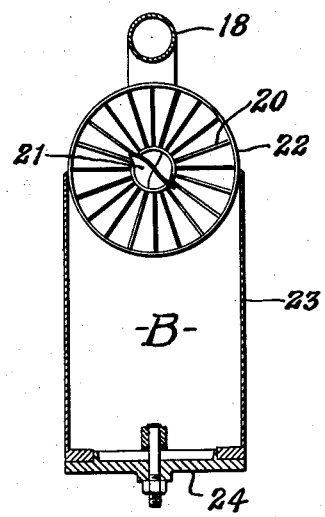
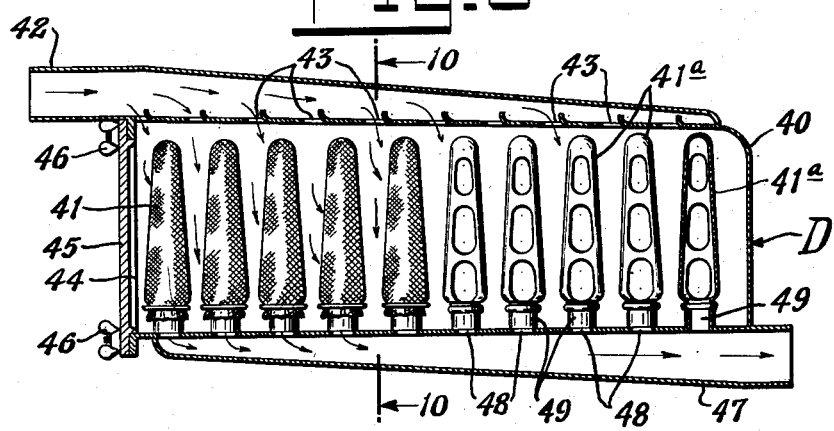
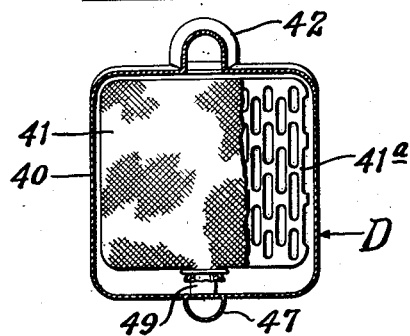
INVENTOR.
Aristide Riccardi.
BY Darby & Darby
ATTORNEYS April 7, 1942.                A. RICCARDI                    2,278,798
                         GAS PRODUCER APPARATUS
                         Filed July 21, 1938          4 Sheets-Sheet 4
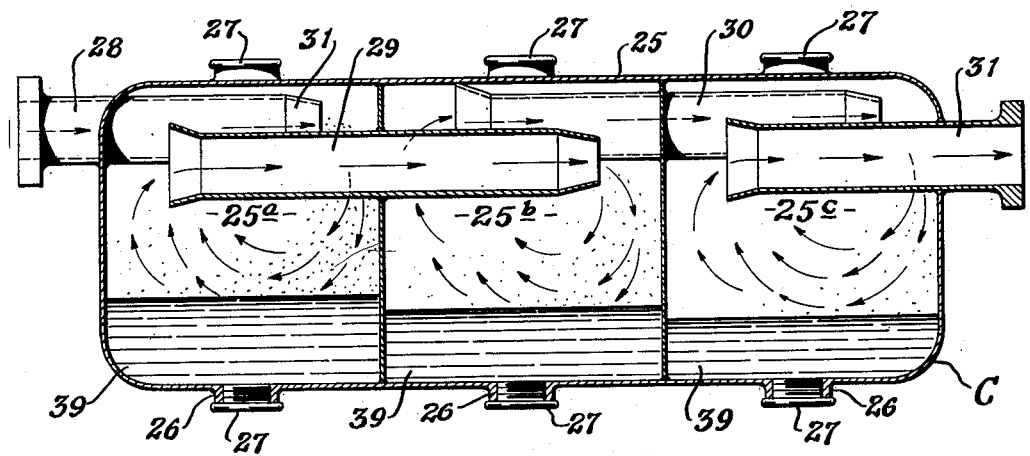
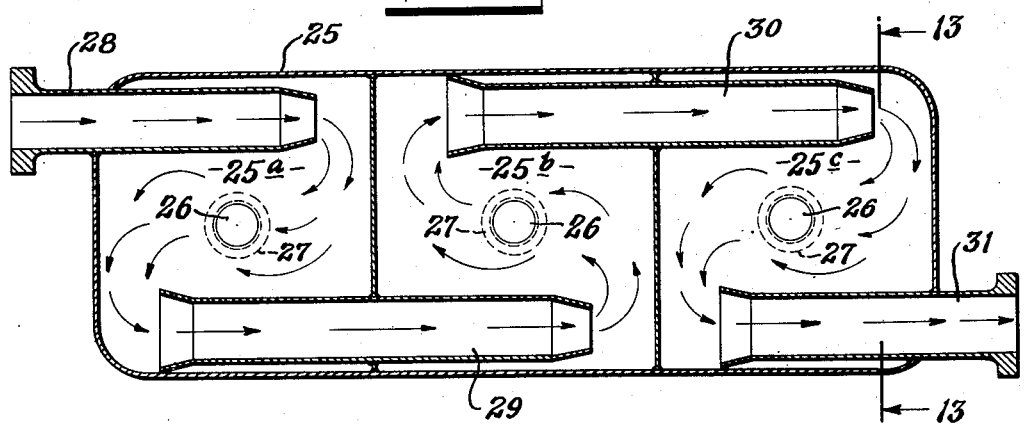
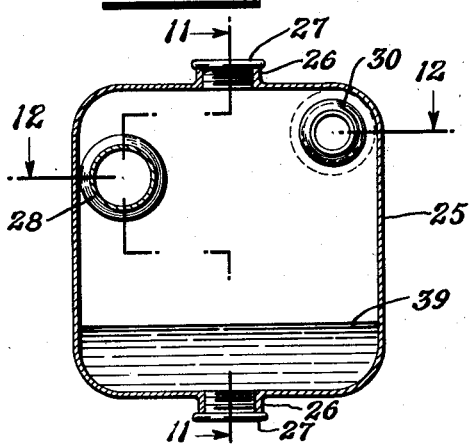
INVENTOR.
Aristide Riccardi
BY
Darby & Darby
ATTORNEYS Patented Apr. 7, 1942

2,278,798

UNITED STATES PATENT OFFICE 2,278,798

GAS PRODUCER APPARATUS

Aristide Riccardi, Rome, Italy, assignor to Dorothy Mackenzie Seaman, New York, N. Y.

Application July 21, 1938, Serial No. 220,597

3 Claims. (Cl. 123—3)

My invention relates to a gas producing apparatus which is particularly designed for use on board of an automotive vehicle to generate and supply combustible gas to the internal combustion engine of said vehicle, but which is also adaptable for generating and supplying gas for use in other motors and for use for many other purposes, such as for heating, cooking, lighting, etc.

One of the objects of the invention is to provide a gas producing apparatus for supplying gas to the engine of an automotive vehicle which is designed and arranged for the practical, efficient and ready production of gas containing a high proportion of carbon oxide.

A further object of the invention is to provide a gas producing apparatus for automotive vehicles and for other purposes which is simple and durable in construction, light in weight, and efficient and economical in operation.

A further object of the invention is to provide a gas producing apparatus adapted to be mounted on board an automotive vehicle to supply gas to the internal combustion engine of the vehicle and which is adapted to operate to generate gas from charcoal, coke and refuse materials such as house refuse, garbage, and agricultural refuse.

A further object of the invention is to provide a gas producing apparatus which includes a gas generator structure constructed without refractory materials and without air or water circulating chambers therein functioning as thermic insulators, and which is made solely of a light metal plate.

A further object of the invention is to provide a gas generator structure into which, during its operation, a central spherical zone of combustion is formed which is thermically isolated from the metal plate with which the generator structure is constructed.

Further objects of the invention will be more fully pointed out hereinafter.

The accompanying drawings illustrate a gas producing apparatus made in accordance with my invention.

Referring to the drawings, the several figures thereof illustrate the following:

Figure 1 is an elevational diagrammatic view, partly in section, illustrating the general arrangement of a gas producing apparatus of my invention and showing said apparatus connected up with an internal combustion engine of the usual type used on automotive vehicles.

Figure 2 is an elevational side view of an air-gas mixing device used in the apparatus.

Figure 3 is a sectional view of the air-gas mixer, taken on the line 3—3 of Figure 4.

Figure 4 is a central sectional view of the air-gas mixer, taken on the line 4—4 of Figure 3.

Figure 5 is a front elevational view of the gas generator structure.

Figure 6 is a side elevation of the gas generator structure showing a portion of the same in section.

Figure 7 is a sectional side view of a centrifugal purifier device employed in the gas producing apparatus.

Figure 8 is a cross-sectional view of Figure 7 taken on the line 8—8 of said figure looking in the direction of the arrows.

Figure 9 is an axial sectional view of a filtering device employed in the gas producing apparatus.

Figure 10 is a cross-sectional view of the filtering device shown in Figure 9 and taken on the line 10—10 of said figure looking in the direction of the arrows.

Figure 11 is a sectional view of a low pressure purifier device employed in the apparatus and taken on the line 11—11 of Figure 13, looking in the direction of the arrows.

Figure 12 is a sectional view of the device shown in Figure 13 taken on the line 12—12, looking in the direction of the arrows.

Figure 13 is a sectional view of the low pressure purifier device taken on the line 13—13 of Figure 12, looking in the direction of the arrows.

Referring now more particularly to Figure 1 of the drawings where the general arrangement of the gas producing apparatus is shown, the several devices which comprise the apparatus of my invention are as follows:

The letter A indicates the gas generating hopper or retort; B designates a centrifugal purifier device employed in the apparatus; C designates the low pressure purifier device; D designates a linen filtering apparatus; and E designates an air-gas mixer employed with said apparatus. The gas producer apparatus is shown connected up with an internal combustion engine F, which is shown in dotted lines.

I will now describe in detail the construction of these several units of the apparatus and the manner in which they operate in carrying out the objects of my invention.

The gas generator apparatus as shown in the drawings is more particularly designed for use on a motor vehicle of the motor van type, but said structure may be made of any suitable size so that it is adapted for use on any type of motor vehicle and so that its design is suitable for the power and the operating conditions of the motor to which it is to be applied. The same apparatus could also be made of any suitable size and design so that it is adaptable for use for producing combustible gas for any purpose where the use of such gas is required.

In the drawings the gas generating structure A, which is more clearly illustrated in Figures 5 and 6, consists of a closed casing or hopper 1 made of a light metal plate. The hopper is provided with a suitable removable cover 2. The light metal plate of which the hopper is constructed is indicated at 6. Secured to the exterior of the hopper casing, at its lower portion, is a coil pipe 3 which has its upper end 3a adapted to be connected with a suitable water supply tank (not shown) and its lower end is positioned so that it communicates with the inside of the hopper casing through a central opening provided in a door 7. The lower portion of the hopper is provided with an air intake opening 4 which permits air to be drawn into the interior of the hopper casing through a nozzle 8. The nozzle 8 is positioned in the plate 6 at a point where the fire zone is designed to be located. The nozzle 8 is provided with an opening therethrough which is calibrated according to the size of the hopper and to the operating conditions of the motor to be fed with the gas produced in the apparatus. A counter plate for the hopper is indicated at 5.

Mounted in the base portion of the hopper is a movable grate 9. The grate is secured to a rotatable shaft 10 which extends across the base of the hopper and has one end thereof projecting on the outside of the casing of the hopper. The projecting end of the shaft 10 is adapted to receive a removable lever (not shown) so that by operating said lever the said grate 9 may be vertically raised and lowered to cause any ashes or clinkers that may have accumulated in the base portion of the hopper during the operation of the apparatus, to be dropped into an ashpit indicated at 11. The ashpit is provided with a door 12 which is adapted to be held in closed position by a suitable closing means 13. By this construction and arrangement it can be seen that the ashes that are dropped into the ashpit by the operation of the grate 9 may be readily removed from the same even while the producer apparatus is in operation and without disturbing the operation thereof.

The hopper A is also provided with an opening 14 through the casing 6 which communicates with the centrifugal purifier B of the apparatus and through which the gas generated in the hopper passes on its way to the motor.

The gas generating hopper is designed to be filled with charcoal or with other forms of solid combustible material and the construction and operation of the same are based upon the theory of the rapid formation, at an elevated temperature, of carbon oxide (CO). In operating the gas generator hopper structure, it is filled with the combustible materials and the door 7 is opened and the combustible fuel is ignited by creating a suction effect which may be produced by an aspirator operated by hand or electrically so that an air current is produced which activates the combustion of the fuel. The fuel, when ignited and if dry, will produce a sufficient quantity of gas to feed the motor within one or two minutes. This initial suction effect for ignition of the fuel may also be produced by the motor itself if the motor is driven with a gasoline feed.

After the fuel has been ignited the door 7 is closed and after the motor is set in operation, by the gas fed to it, the operation of the motor will cause air to be sucked into the air intake opening 4 and so that said air will pass with a high velocity into the space between the plate 6 and the counter plate 5, absorbing heat from the latter which is thereby cooled. The air thus becomes superheated and enters into the hopper casing through the nozzle 8 and it thereby activates the combustion which, when the motor operates at high velocity, is such that a temperature is rapidly produced in the combustion zone of 1800° C. to 2000° C. However, as the air passes into the hopper with a great speed and in a small quantity, it is completely absorbed by the combustibles in the exothermic zone for the needs of its combustion. Thus there is obtained a restricted diagonal zone of combustion (indicated in Figure 1) formed by an incandescent nucleus, said zone being exothermic and endothermic and isolated in the mass of the combustible, the periphery of which, which is in contact with the casing, being only slightly warm.

From the above it will be seen that the gas producer structure of the present invention differs from prior producers in the following respects. In the types of gas producers in which the inner walls are coated with refractory materials, the exothermic zone, in a major portion of its periphery, is in direct contact with the refractory material so that the endothermic zone is thereby greatly restricted. In the present gas producer structure the central incandescent nucleus (exothermic zone) is completely surrounded by the combustible forming a peripherically complete endothermic zone with a maximum reactivity.

Also in producers in which the combustion is activated with a considerable volume of air having a low velocity, a large quantity of carbon dioxide ($CO_2$) is produced which not only is a non-combustible gas, but shows its presence by blowing out the fire in ignited bodies. In the producer of the present invention the production of carbon dioxide and other inert gases takes place similarly, but owing to the high temperature the gases are disassociated to a large extent almost as soon as they are formed, thus producing carbon oxide and hydrogen having an elevated heating power, and a good thermodynamical efficiency.

In the operation of the producer, as above pointed out, the water which is fed through coil 3 is caused to be evaporated and the steam thus produced is caused to be entered directly into the fire zone through the central opening in the door 7 and thus serves to enrich the gas with hydrogen.

The combustible gas produced in the hopper A passes therefrom through the opening 14. The opening 14 is provided with a suitable sieve 16 which functions to stop small pieces of charcoal or clinkers that would otherwise pass into the filtering and cleaning devices of the apparatus.

The gas, after passing through the opening 14 and the sieve 16, enters the centrifugal purifier B which is shown more clearly in Figures 7 and 8. The centrifugal purifier is provided with an entrance tube 17 and gas exit tubes 18 and 19. Mounted in the interior of the purifier casing is a propeller 20 having fixed helicoidal blades.

Mounted in the tube 19 is a fixed helicoidal blade 21. The purifier is formed with a main body 22 and with a decompression chamber 23, which is provided with a cleansing stopper 24.

The gas sucked from the producer hopper A by the operation of the motor is delivered to the centrifugal purifier by the tube 17 in the direction of the arrows shown in Figure 7, and as the volumetric capacity therein is greater than that existing in the chamber 22 of the purifier, the gas velocity is suddenly reduced, and its density decreases, and as it passes in the meanwhile between the fixed helicoidal blades of the propeller 20 it assumes a whirling motion. In view of the capacity and the position of the chamber 23 with respect to the body portion 22 of the purifier, there will be formed in chamber 23 a depression which is greater than that formed in chamber 22 and the gas therefore will tend to fill up this greater depression. However, as the gas is sucked by the motor into the central tube 19 in the direction of the arrows, it strikes against the fixed central blade 21 and stops its vortex rotation and separates from the gas any solid particles, such as ashes, small pieces of clinkers, and the like, which it has carried in suspension. Due to the fact that these particles so separated are heavier than the gas, they will drop into the decompression chamber 23 and they may be later removed from said chamber through the opening 24.

The gas drawn into the central exit tube 19 then passes through the bent exit tube 18 into the low pressure purifier C which is more clearly shown in Figures 11, 12 and 13.

The low pressure purifier C comprises a structure formed with a casing 25 which is divided into chambers 25a, 25b and 25c. These chambers are provided with screw threaded openings 26 which are adapted to be closed by closure caps 27. The lower pressure purifier is provided with an entrance tube 28 which is adapted to be connected with the tube 18 leading from the centrifugal purifier B. The tube 28 has its other end extending into the chamber 25a. Communicating with chamber 25a and extending into chamber 25b is the tube 29. Also communicating with chamber 25b and extending into chamber 25c is the tube 30. Chamber 25c is also provided with a tube 31 which extends through the end wall of said chamber and is adapted to connect at its outer end with the entrance tube 42 of the filter device D. The chambers 25a, 25b and 25c are partially filled with oil which is indicated at 39.

As the gas generated in the hopper A enters tube 28 of the low pressure purifier in the direction indicated by the arrows it passes through the restricted neck 31 of the tube 28 into the chamber 25a. The restricted neck 31 increases the linear velocity of the gas and also its density and when said gas enters into chamber 25a, it suddenly expands and with the consequent drop of its velocity, and its density, any ash particles that may be carried in suspension are left in chamber 25a and drop to the bottom thereof where they remain fixed on the oil 39 which is contained in said chamber.

Thereafter the gas enters the expanded portion of the tube 29 and is recompressed and is delivered into the chamber 25b where the action as above described as taking place in chamber 25a, is repeated. The gas then passes through the tube 30 into the chamber 25c where the same action is again repeated. Instead of only having three chambers, as shown in the low pressure purifier C illustrated in the drawings, said purifier may be made with more of said chambers depending upon the size of the operating conditions of the motor and the size of the casing of the purifier.

The purifier C functions also as a steam condenser for the steam that may have been carried forward from the gas generator A.

The gas passes from the low pressure purifier C through the tube 31 to the entrance tube 42 of a linen filtering device D which is more clearly shown in Figures 9 and 10.

The linen filtering device comprises a casing 40 forming a decompression chamber for the gas. The casing has mounted therein a plurality of linen filtering elements 41 which are mounted on frames 41a. The casing is also provided with an entrance tube 42 adapted to be connected with tube 31 of the preceding low pressure purifier C. The tube 42 is mounted on top of the casing of the filtering structure and is positioned so that it communicates with openings 43 formed in the top of the casing. The casing is also open at its end 44 so that access to the interior may be had for cleaning purposes. Said opening is adapted to be closed by a suitable closure indicated at 45, and which is held in closed position by locking means 46. The bottom of the casing of the filtering device is provided with an exit tube 47 for the gas to leave the filter. Said exit tube is mounted on the bottom of the casing and communicates with openings 48 formed in the bottom wall of the casing and which in turn communicates with the base tube elements 49 on which the filtering frames 41a are mounted.

The gas after leaving the low pressure purifier C enters tube 42 of the linen filtering device and passes through the openings 43 in the top of the filter casing and in a state of under pressure passes through the linen filters, leaving thereon any impurities which it still may contain. The gas then passes through the connecting tubes 49 and through the openings 48 into the collecting tube 47 in the direction shown by the arrows in Figure 9. The faces through which the gas passes on its way through the filtering device and the surfaces and the number of faces of the frames are so designed that all together they exceed very substantially the cross-section of the tubes, and taking into account the mechanical resistance due to the warp of the textile used for the filters no excessive loss of load occurs so as to cause a rapid and a ready saturation of the filtering frames 41.

In case the filtering device is to be cleaned, the closure 41 is opened and the frames 41a are removed from their connecting tubes and the linen pockets 41 are beaten out and then these parts are remounted in the filter casing.

After the gas has passed through the filtering device it flows through the air-gas mixer E, which is more clearly shown in Figures 2, 3, and 4.

The air-gas mixer is provided with an entrance tube 49 which has mounted therein a diaphragm valve 50. The valve 50 is adapted to control the gas entering the mixer device. The air-gas mixer is also formed with an air inlet nozzle 51 for the admission of air. Mounted in the mixer structure is cross nozzle 52 having the helicoidal mixing wings 52a mounted therein. The mixer structure is also provided with the diffuser 53. The entrance of air in the inlet nozzle 51 is controlled by an air control valve 54. The diaphragm valve 50 mounted in the entrance tube 49 is adapted to be operated by a control lever 55 which in turn is connected to a cam 56 through a rod 57. The cam 56 is provided for the purpose of synchronizing the opening of the valves 50 and 54. The control for the synchronizing cam device is indicated at 57. A hand or pedal control indicated at 58 is provided on the vehicle for controlling the operation of the air-gas mixer.

The essential feature of the air-gas mixer apparatus is that of securing a constant and synchronous composition of the air-gas mixture for any condition of running of the motor. By moving the hand or pedal control 58 the valve 50 controlling the gas admission to the mixer opens out moving at the same time the sector cam 56, and by maneuvering at the same time the control 57, the pivot of the rod controlling valve 54 is displaced in the sector cam 56 so that by varying the radius there is a corresponding variation in the opening of the air admission valve 54, so that the quantity of air admitted is synchronized with the quantity of gas required, and as said operation is made when the motor is running, it may readily be judged from the efficiency of the motor when the mixture is homogeneous, and owing to the particular design of the cam 56, the composition of the mixture is synchronous and homogeneous for all conditions of running of the motor.

As may readily be seen from Figures 2, 3 and 4, the entrance of the air in the air-gas mixer is co-axial and radial with respect to the passage of the gas. The volumetric capacities and consequently the yield and the linear velocity of the single fluids at the point of junction, are calculated so as to have a quantity of air and of gas adapted to form a mixture having the required composition, with a minimum load loss for any running condition of the motor. The helicoidal blades 52 forcing the fluids towards the meeting point with a high vortex rotation, assist in obtaining a perfect mixture and the consequent maximum efficiency allowed by the motor. The diffuser 53 serves to regulate the linear velocity of the mixture so as to adjust said velocity to all the requirements of the motor.

From the above description it will be seen that my new gas producer apparatus comprises a plurality of units which are particularly designed and constructed for the practical and efficient production of a producer gas to be supplied to an internal combustion engine of an automotive vehicle. Also, by reason of the method by which the gas is produced it will contain the highest proportion of carbon oxide. Furthermore, the construction and the operation of the apparatus is exceedingly simple and economical and the entire apparatus may readily be installed for use on board an automotive vehicle of various types. The gas producing hopper is made without using refractory materials and without air or water circulating chambers and with light-weight metal plate. An important feature of the gas producing structure is that the volumetric capacity of the fire zone and the quantity and the direction of flow of air admitted for burning the fuel in relation to the fuel mass, are adapted to feed only a central incandescent sphere (zone of combustion) which is sufficient to produce the gas required for any operating condition of the motor, but is insufficient to feed the mass of the combustible materials contained in the whole body of the producer structure. Consequently the fuel surrounding the central mass of incandescent fuel is not ignited and serves to protect the walls of the producer hopper from the direct contact of the ignited fuel. This arrangement serves also to facilitate the sharp variations occurring in the operating conditions of the motor.

The producer apparatus shown and described herein has been in actual practice shown to be capable of producing from 3 to 3.5 cubic meters of carbon oxide gas per minute.

While the gas producer apparatus of my invention has been described as being adapted for use on automotive vehicles, it is obvious that it may also be applied for use on boats propelled by gas engines, tractors, railroad cars and any other vehicle or apparatus where gas engines may be employed, and where a relatively light-weight, efficient gas producer is desired, and it also may be used for producing a combustible gas for use for many other purposes such as for cooking, heating, lighting. Also the apparatus, even when installed on an automotive vehicle may be utilized not only for generating and supplying gas for the engine of the vehicle but for supplying gas for use for cooking, lighting and for other purposes, which makes it decidedly advantageous for camping and military purposes.

Having thus described my invention what I claim and desire to secure by Letters Patent is:

1. A power producing plant adapted to burn solid combustible fuel therein and designed for use in supplying combustible gas to an internal combustion engine of an automotive vehicle, and comprised of a closed casing made of light metallic plate and having an air intake nozzle for supplying air into the casing, and an outlet opening communicating with the internal combustion engine, said air intake nozzle being provided with an opening therethrough to permit only a predetermined and small volume of air to enter said casing, said outlet opening being controlled by the operation of the internal combustion engine so as to cause the air entering said casing through said nozzle to be drawn through the fuel mass in the casing at a high velocity and in a predetermined direction and to create a restricted diagonal zone of combustion which is exothermic and which is surrounded by combustible forming an endothermic zone, and means to preheat the air before it enters said casing comprising a confined passage through which the air passes which is positioned in close proximity to the exothermic zone of combustion and so as to be heated thereby.

2. A power producing plant adapted to burn solid combustible fuel therein and designed for use in supplying combustible gas to an internal combustion engine of an automotive vehicle, and comprised of a closed casing made of light metallic plate and without the use of refractory materials or water or air circulating chambers therein, and having an air intake nozzle for supplying air into the casing, and an outlet opening communicating with the internal combustion engine, said air intake nozzle being positioned in the casing at a point adjacent to where the fire zone in the fuel mass is to be located and being provided with an opening therethrough to permit only a predetermined and small volume of air to enter said casing, said outlet opening being controlled by the operation of the internal combustion engine so as to cause the air entering said casing through said nozzle to be drawn through the fuel mass in the casing at a high velocity and to create a restricted diagonal zone of combustion which is exothermic and which is surrounded by combustible forming an endothermic zone, means to preheat the air before it enters said casing consisting of a confined passageway through which the air passes and which is positioned in close proximity to the exothermic zone of combustion and so that it will be heated by said zone, and means for injecting steam directly into the incandescent nucleus of the exothermic zone.

3. A power producing plant adapted to burn solid combustible fuel therein and designed for use in supplying combustible gas to an internal combustion engine of an automotive vehicle, and comprised of a closed casing made of light metallic plate and having an air intake nozzle for supplying air into the casing, and an outlet opening communicating with the internal combustion engine, said air intake nozzle being provided with an opening therethrough to permit only a predetermined and small volume of air to enter said casing, said outlet opening being controlled by the operation of the internal combustion engine so as to cause the air entering said casing through said nozzle to be drawn through the fuel mass in the casing at a high velocity and in a predetermined direction and to create a restricted zone of combustion which is exothermic and surrounded by an endothermic zone of combustible material, means for preheating the air passing through said air intake nozzle and before it enters the casing, said means comprising a passageway through which the air passes which is positioned so that it will be heated by the incandescent nucleus of the exothermic zone, and a water supply means in which the water passing therethrough is converted into steam by the radiated heat from said casing, and means to inject the steam produced in said water supply means directly into the exothermic zone of combustion in said casing to enrich the gas produced therein.

ARISTIDE RICCARDI.